United States Patent [19]

Kersten

[11] Patent Number: 5,583,486

[45] Date of Patent: Dec. 10, 1996

[54] SECURITY ACCESS ARRANGEMENT

[75] Inventor: Herbert Kersten, Adelaide, Australia

[73] Assignee: Monaad Corporation Pty Limited, Seacliff, Australia

[21] Appl. No.: 347,896

[22] Filed: Dec. 1, 1994

[30] Foreign Application Priority Data

Feb. 23, 1994 [AU] Australia ................. PM4023

[51] Int. Cl.⁶ .................................. G08B 13/14
[52] U.S. Cl. .................. 340/568; 70/256; 180/287; 307/10.2; 340/426; 340/539; 340/825.31; 455/100; 455/345
[58] Field of Search ................... 340/568, 571, 340/572, 573, 541, 539, 426; 455/67.1, 67.7, 100, 345; 307/10.2, 10.3, 10.6; 70/256, 257; 180/287

[56] References Cited

U.S. PATENT DOCUMENTS

| | | | |
|---|---|---|---|
| 3,478,344 | 11/1969 | Schwitzgebel et al. | 340/539 X |
| 3,891,980 | 6/1975 | Lewis et al. | 340/572 |
| 4,260,982 | 4/1981 | DeBenedictis et al. | 340/539 |
| 4,573,046 | 2/1986 | Pinnow | 340/825.56 |
| 4,593,273 | 6/1986 | Narcisse | 340/539 |
| 4,598,272 | 7/1986 | Cox | 340/539 |
| 4,663,625 | 5/1987 | Yewen | 340/825.54 |
| 4,733,215 | 3/1988 | Memmola | 340/426 |
| 4,738,334 | 4/1988 | Weishaupt | 340/426 X |
| 4,785,291 | 11/1988 | Hawthorne | 340/573 |
| 4,811,013 | 3/1989 | Akutsu | 340/825.31 |
| 4,871,997 | 10/1989 | Adriaenssens et al. | 340/539 |
| 4,899,135 | 2/1990 | Ghahariiran | 340/573 |
| 4,942,393 | 7/1990 | Waraksa et al. | 340/825.72 |
| 4,987,406 | 1/1991 | Reid | 340/539 |
| 5,119,072 | 6/1992 | Hemingway | 340/573 |
| 5,157,389 | 10/1992 | Kurozu et al. | 307/10.2 X |
| 5,196,825 | 3/1993 | Young | 340/539 |
| 5,349,329 | 9/1994 | Smith | 340/539 |

FOREIGN PATENT DOCUMENTS

| | | |
|---|---|---|
| 87947/82 | 10/1982 | Australia . |
| 17303/83 | 3/1984 | Australia . |
| 68203/90 | 6/1991 | Australia . |
| 2423015 | 12/1979 | France ................. 340/426 |
| 2543715 | 10/1984 | France . |
| 3803541 | 8/1989 | Germany . |
| 4003280 | 8/1991 | Germany ................. 70/256 |
| 4030880 | 4/1992 | Germany ................. 307/10.2 |
| 2233487 | 1/1991 | United Kingdom ................. 340/426 |
| 2243476 | 10/1991 | United Kingdom . |
| 2259631 | 3/1993 | United Kingdom . |
| 84/03975 | 10/1984 | WIPO . |
| 87/06748 | 11/1987 | WIPO . |
| 9202911 | 2/1992 | WIPO ................. 70/256 |
| WO93/02897 | 2/1993 | WIPO . |
| WO94/14639 | 7/1994 | WIPO . |
| 94/25944 | 11/1994 | WIPO . |

OTHER PUBLICATIONS

Derwent Abstract Accession No. 94–273647/34, GB 2276025 A (Barwell) 14 Sep. 1994.
Patent Abstracts of Japan, P1824, p. 67, JP 6–215281A (Toshinori Sekine) 5 Aug. 1994.
Patent Abstracts of Japan, P1179, p. 101, JP 3–1296A (Chou Electron Services K.K.) 7 Jan. 1991.
Patent Abstracts of Japan, P857, p. 164, JP 63–316298A (NEC Corp.) 23 Dec. 1988.

*Primary Examiner*—Thomas Mullen
*Attorney, Agent, or Firm*—Merchant, Gould, Smith, Edell, Welter & Schmidt, P.A.

[57] ABSTRACT

A three part security access arrangement in which the first part is associated with an authorized person in the form of, for example a belt buckle, the second part is attached to a valuable item, for example a wallet, and the third part is associated with an area of restricted access, such as a car. Access to the restricted area is denied unless all three parts are in close proximity. If either of the first or second parts are absent the third part will not allow access to the restricted area. The first and second parts incorporate means for providing an audible alarm if they are separated by greater than a pre-determined distance.

16 Claims, 11 Drawing Sheets

SECURITY ACCESS ARRANGEMENT

This invention relates to a security access arrangement incorporating an electronic key or electronic token, which automatically allows access to an area by an authorised person based on the proximity of the key or token to the area. In particular the invention provides a system that minimises the risk of an unauthorised person gaining access to the area by illegitimately obtaining a key or token.

BACKGROUND ART

Electronic key systems for accessing restricted areas are known and take a number of forms. These include magnetic card readers, keypad door locks, interrogator/transponder systems and various transmitter/receiver type systems.

Magnetic card readers and keypad door locks offer minimal security or convenience improvements compared to conventional mechanical locks. The user must physically contact the card reader or keypad to obtain entry. Both of these access control systems could easily be compromised by the loss of the magnetic card or inadvertent disclosure of the keypad code. In either case an unauthorised person could access the restricted area.

Interrogator/transponder systems and transmitter/receiver systems are more sophisticated in that they do not require any physical action on the part of the authorised person. These systems permit access based on the proximity of a key or token to an access controller.

One early example of the interrogator/transponder security system is described in U.S. Pat. No. 3,891,980 assigned to Lewis Security Systems Ltd. This patent describes a system in which an authorised person carries a token that generates signals at two discrete frequencies when the person approaches a door leading to a restricted area. A sensor detects the person's presence and activates a control unit which interrogates inductive loops adjacent the door to determine if the correct signals are being picked up. If the correct signals are present the door is opened automatically, otherwise the door remains locked and an alarm may be given.

The prior art includes many examples of transmitter/receiver security systems designed primarily for automatic locking and unlocking of automobile doors. Early devices required the user to push a button on a transmitter that sent a radio frequency signal to a receiver to activate solenoid-operated electronic door locks. More recent devices have removed the necessity for any physical action by the user and work entirely on the basis of proximity.

One such device is described in U.S. Pat. No. 4,688,036 assigned to Nissan Motor KK. This patent describes a portable code signal transmitter that is approximately the size and shape of a credit card. The transmitter produces a radio frequency signal with a unique code that is detected by a controller in a vehicle. Vehicle functions are actuated by the controller when the unique code matches a preset code stored in the controller.

Another device is described in U.S. Pat. No. 4,942,393 assigned to Lectron Products Inc. This patent describes a system to automatically unlock and lock the doors of an automotive vehicle as a user approaches or moves away from the vehicle. The system consists of a portable beacon carried by the user, a receiver/controller in the vehicle and an antenna connected to the receiver controller. The patent describes a number of improvements over earlier devices including a motion sensor to conserve battery life and transmitter signals embodying differential phase encoded data with error correction coding of the data to enhance noise immunity and signal discrimination.

The prior art patents have also addressed the problem of a user leaving the transmitter in the vehicle, one example being U.S. Pat. No. 4,672,375. In this patent the controller has many of the features described above but also includes a disabler feature. The disabler becomes active when the vehicle door is closed and locked, and disables the entry system if the unique code is detected for a period exceeding a predetermined time. An alarm sounds to remind the user to collect the transmitter.

The prior art sometimes refers to these systems as 'keyless' referring to the absence of conventional key and lock mechanisms although in the strictest sense the mechanical key has merely been replaced by an electronic key. The unique code transmitted by the electronic key is analogous to the teeth pattern of a mechanical key. The electronic key can be more versatile and the transmitted signal can provide functional information as well as an identifying code. The ability to provide an alarm if the electronic key is left in the vehicle is also a valuable advantage.

Although having a number of advantages over conventional keys all the known prior art devices suffer from the same problem of an unauthorised person being able to access a restricted area (including a motor vehicle) by simply gaining access to the signal generating device. Thus a device that is lost, left or stolen can negate all of the security advantages embodied in the "keyless" entry system.

This shortcoming is highlighted where such a system is embodied as a motor vehicle security system. It is common for the signal generating device to be embodied as a tag that is attached to a key ring holding the vehicle keys. A carjacker can readily access a vehicle and operate the ignition if they have the key ring with the tag attached. Prior art devices that embody the signal generating device in the key head only exacerbate the problem.

Clearly, an arrangement is needed which is disabled when separated from the authorised person thereby preventing unauthorised persons from gaining access to and use of the restricted area even if they hold a signal generating device.

Devices to achieve this object exist in the form of retina pattern and fingerprint recognition systems. While such devices would overcome the stated problem they are too expensive and insufficiently portable to be a practical solution to the problem of vehicle and facility security (except in larger facilities). A more economically and practically viable solution is required.

OBJECT OF THE INVENTION

It is an object of the present invention to provide a security access arrangement that operates when a security access device is proximate to an authorised person but is disabled when the security access device is more than a pre-set distance from the authorised person.

A further object of the present invention is to provide an arrangement that alerts the authorised person when the security access device is removed by greater than a pre-set distance from the authorised person.

It is a still further object of the invention to provide a number of security access devices that can be individually configured for a plurality of independent authorised persons to gain access to a restricted area.

Another object of the present invention is to provide the public with an economic and useful alternative to existing security access systems.

DISCLOSURE OF THE INVENTION

In one form of the invention although it need not be the only or indeed the broadest form there is proposed a security arrangement comprising:

a first part associated with an authorised person;

a second part adapted to be attached to an item; and a third part associated with a restricted access area;

wherein the first, second and third parts include equivalent electronic circuitry comprising:

a signal transmitting means adapted to transmit coded signals;

controller means in electrical connection with the signal transmitting means and adapted to supply coded signals to the signal transmitting means;

signal receiving means in electrical connection with the controller means and adapted to receive coded signals and supply the received coded signals to the controller means; and a power supply adapted to power the operation of the signal transmitting means, signal receiving means and controller means;

said first, second and third parts being separate from one another and being arranged such that access to the restricted area can only be obtained if the first, second and third parts are proximate one another.

Although the parts may, include equivalent electronic circuitry each part will preferably perform a separate function. The first part is a signal enabling tag, the second part is a signal transmitting tag and the third part is a signal receiver/controller.

Therefore, in a further form, the invention resides in a security access arrangement including:

a signal enabling tag adapted to be carried by an authorised person and adapted to transmit an enabling signal;

a signal transmitting tag adapted to transmit a coded transmit signal and comprising signal enabling tag detection means adapted to detect the presence of the signal enabling tag;

a signal receiver/controller means associated with an area of restricted access and adapted to receive signals from the coded signal transmitting tag when the signal transmitting tag is within a pre-set range and interpret the decoded signals and to activate one or more predetermined functions;

said signal transmitting tag and said signal receiver/controller means all being separate from one another; and wherein the signal transmitting tag does not transmit the coded transmit signal unless the signal enabling tag and signal transmitting tag are proximate to one another.

It will be appreciated that by requiring that the signal enabling tag and the signal transmitting tag are proximate one another the loss or theft of one or other of the tags does not result in compromise of the security status of the restricted area. If the signal enabling tag is not within a pre-set range of the signal transmitting tag the signal transmitting tag will not transmit a coded signal and access to the restricted area cannot be obtained.

The signal enabling tag may be embodied in an item that is normally located on the authorised person. For example it may take the form of a belt buckle, a ring, a pendant or a clip. If embodied as a clip it may be attached to a valuable item such as a wallet, passport, mobile phone, etc. The advantage of this arrangement will become evident as optional additional features of the invention are explained.

The signal transmitting tag may be embodied in similar ways to prior art devices such as on a key ring or as part of a conventional ignition key (for vehicle applications). The signal transmitting tag should preferably be unconstrained in its position whereas the signal enabling tag can be constrained to a fixed location, such as a belt buckle.

In preference the signal enabling tag, signal transmitting tag and receiver/controller each have the same electronic circuitry comprising:

a signal transmitting means adapted to transmit coded signals;

controller means in electrical connection with the transmitter means and adapted to supply coded signals to the signal transmitting means;

signal receiving means in electrical connection with the controller means and adapted to receive coded signals and supply the received coded signals to the controller means; and a power supply adapted to power the operation of the signal transmitting means, signal receiving means and controller means.

In another form the signal enabling tag comprises a battery-free, radio frequency transponder that returns a coded signal in response to an interrogating pulse from the signal transmitting means. Low frequency, short-range transponders using FM transmission techniques and suitable for the present application are known. The coded signal transmitted by the transponder is received by the signal enabling tag detection means which then enables the coded signal transmitting means of the signal transmitting tag.

In an alternative arrangement the signal enabling tag comprises a power supply and a radio frequency transmitter that constantly transmits an identification coded signal. This alternative requires periodic replacement of the power source that could be indicated by a battery charge indicator (visual or aural) at the signal enabling tag or signal transmitting tag.

In a further alternative arrangement the signal enabling tag can comprise a power supply, a radio frequency receiver/transmitter and an encoder/decoder module. In this form the signal enabling tag would transmit a unique code when polled by the transmitter of the signal transmitting tag. The receiver of the signal enabling tag would need to be constantly on to receive the polling signal but the transmitter would only be activated as required. This alternative would have less power drain than the preceding alternative but require more complex circuitry.

In preference the signal enabling tag detection means of the signal transmitting tag includes a radio frequency receiver and the coded signal transmitting means includes a radio frequency transmitter and the signal transmitting tag further comprises a power supply, an encoder/decoder and a controller.

In preference the signal transmitting tag further comprises a function switch adapted to provide signals to the controller enabling one or more of a range of functions able to be provided by the controller. The controller is preferably a programmable microprocessor and may include associated memory means.

In preference one or both of the signal transmitting tag and signal enabling tag further include alarm means adapted to emit an alarm if the distance between the tags exceeds a predetermined distance. Preferably an alarm is also emitted to alert a low power supply condition.

In preference the receiver/controller comprises a power supply, a radio frequency receiver, a decoder, a controller and code memory. The controller is preferably a microprocessor adapted to compare decoded signals from the decoder with stored signals from the code memory and to output activating signals in response to the comparison.

In preference the power supplies are lithium batteries charged by solar cells. The signal enabling tag and signal transmitting tag can operate independent of the receiver/controller to provide an item security system in which either or both tags emit an alarm if the separation between the tags exceeds a predetermined amount. In the case where only one tag emits an alarm it is preferable that the tag emitting the alarm is the one that is in motion. This can be achieved by incorporating a motion sensor in the tag.

Therefore, in a further form of the invention there is proposed an item security arrangement comprising:

a signal enabling tag including enabling signal transmitting means; and a signal transmitting tag including enabling signal detection means and alarm means;

wherein the alarm means is adapted to provide an indication if the distance between said tags exceeds a predetermined distance such that the enabling signal is not detected by the enabling signal detection means.

In an alternative form both tags include enabling signal transmitting means, enabling signal detection means and alarm means such that both tags provide an alarm if the distance between said tags exceeds a predetermined distance such that the enabling signal is not detected by the enabling signal detection means.

BRIEF DESCRIPTION OF THE DRAWINGS

To further assist in understanding the invention reference will be made to the following drawings in which.

DETAILED DESCRIPTION OF THE DRAWINGS

Figure 1:
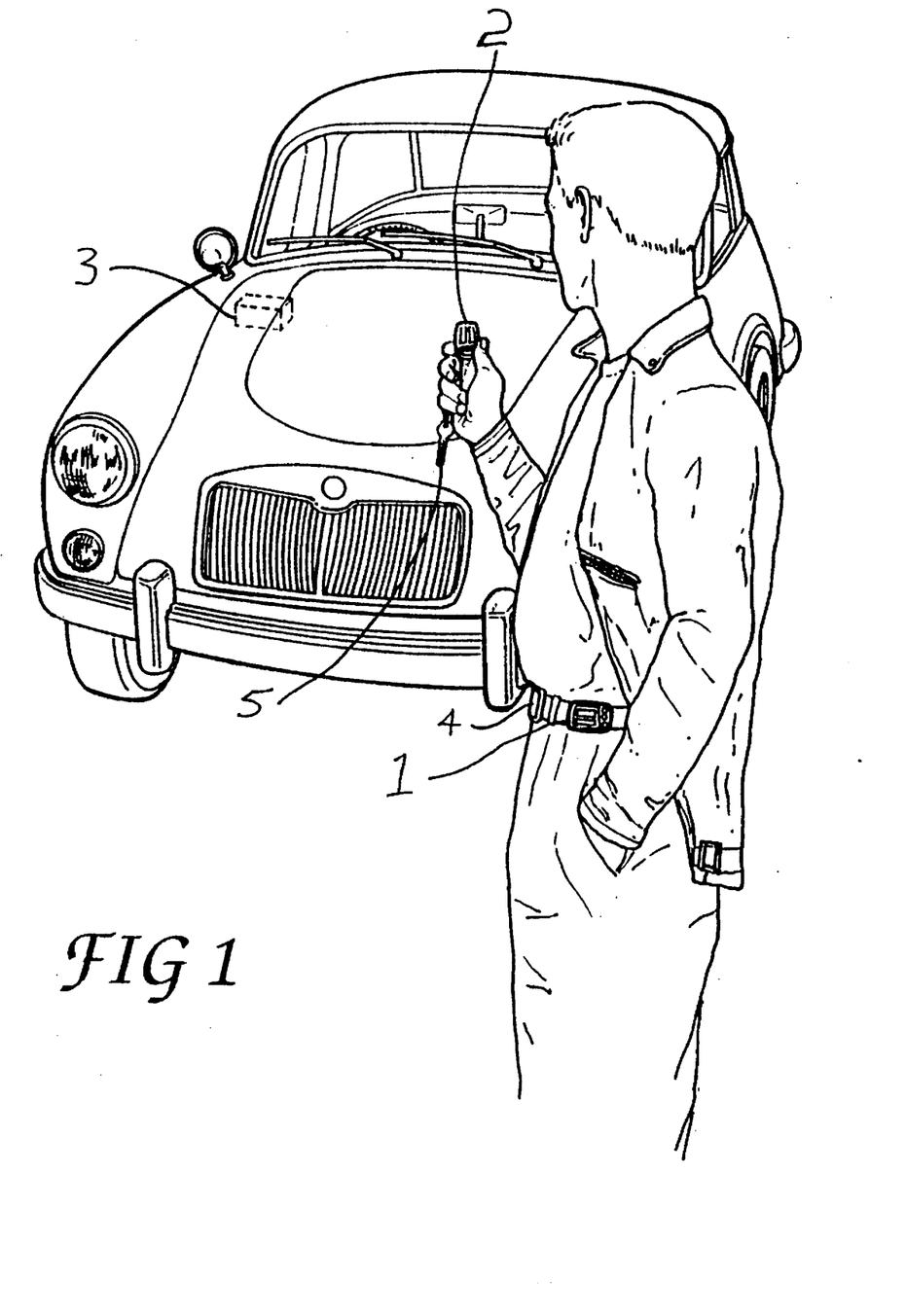
FIG. 1 illustrates a typical embodiment of a security access arrangement.

Referring now to the drawings in detail there is shown in FIG. 1 a sketch of a typical manner of employing the security access arrangement of the present invention. In the depicted application the invention is embodied as a vehicle security arrangement. A person has a first part 1 attached to a belt 4. A second part 2 is attached to a valuable item such as keys 5. As long as the person has the keys, the first part 1 and the second part 2 will be in proximity to each other and access to the secure area, in this case a vehicle, is possible.

Within the vehicle is a third part 3. The third part 3 receives signals from the second part 2 which directs the third part 3 to perform certain functions. These functions may be active, such as unlocking the doors, or may be passive, such as enabling vehicle operation. The third part only performs the functions if it detects a correct signal from the second part which will only occur if the first part is in proximity.

Figure 2:
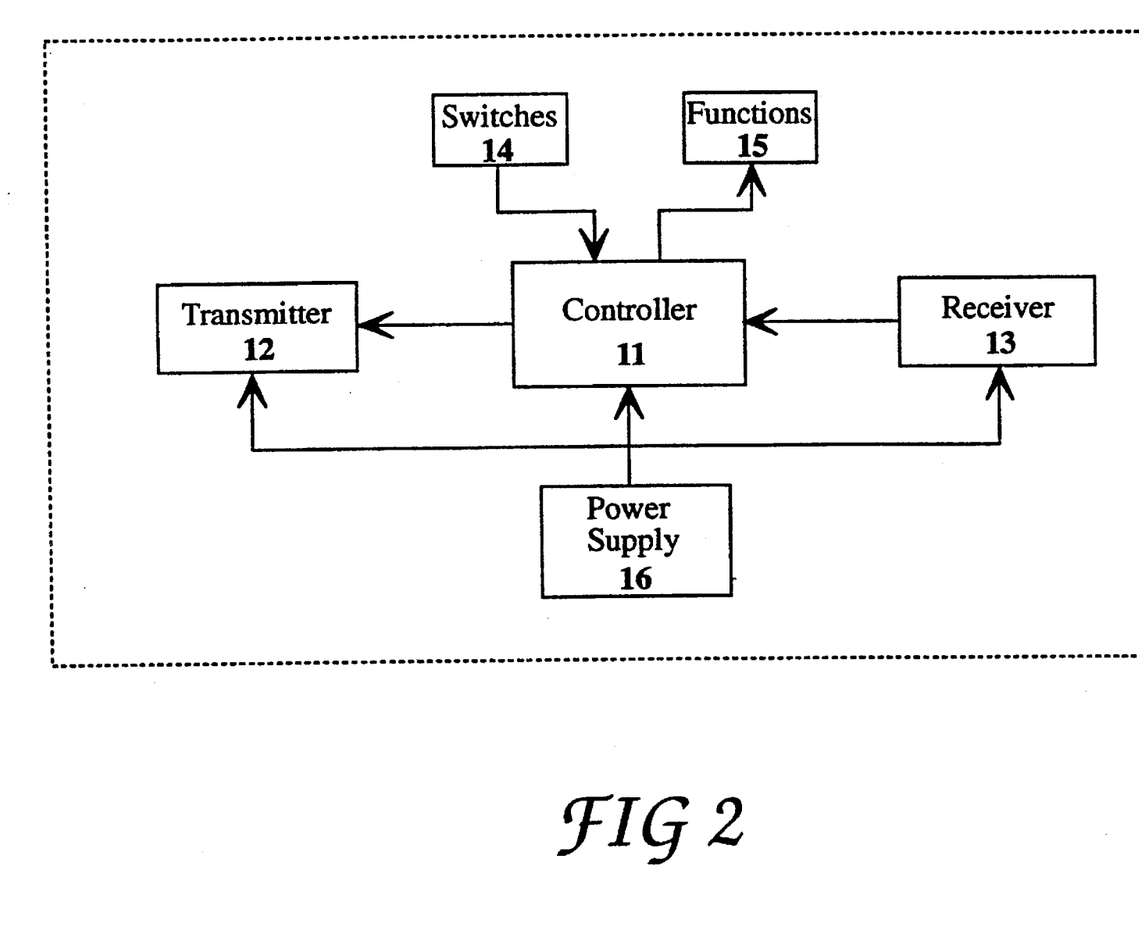
FIG. 2 is a block diagram of the circuitry of the components of a security access arrangement.

It will be appreciated that each of the three parts of the security access arrangement perform one or more of the functions of receiving, transmitting and controlling. The electronic arrangement of each part may be identical with only the required functions being activated. A block diagram for the electronic arrangement of a part is shown in FIG. 2.

In one preferred embodiment, being the best method known to the inventor of working the invention, each part comprises a controller 11 adapted to receive signals from a receiver 13 and provide signals to a transmitter 12. The controller 11 may perform a variety of functions 15 and the operation of the controller 11 may be adjusted by switches 14. The part is powered by power supply 16. The preferred embodiments of each of these elements are described in more detail below.

Figure 3:
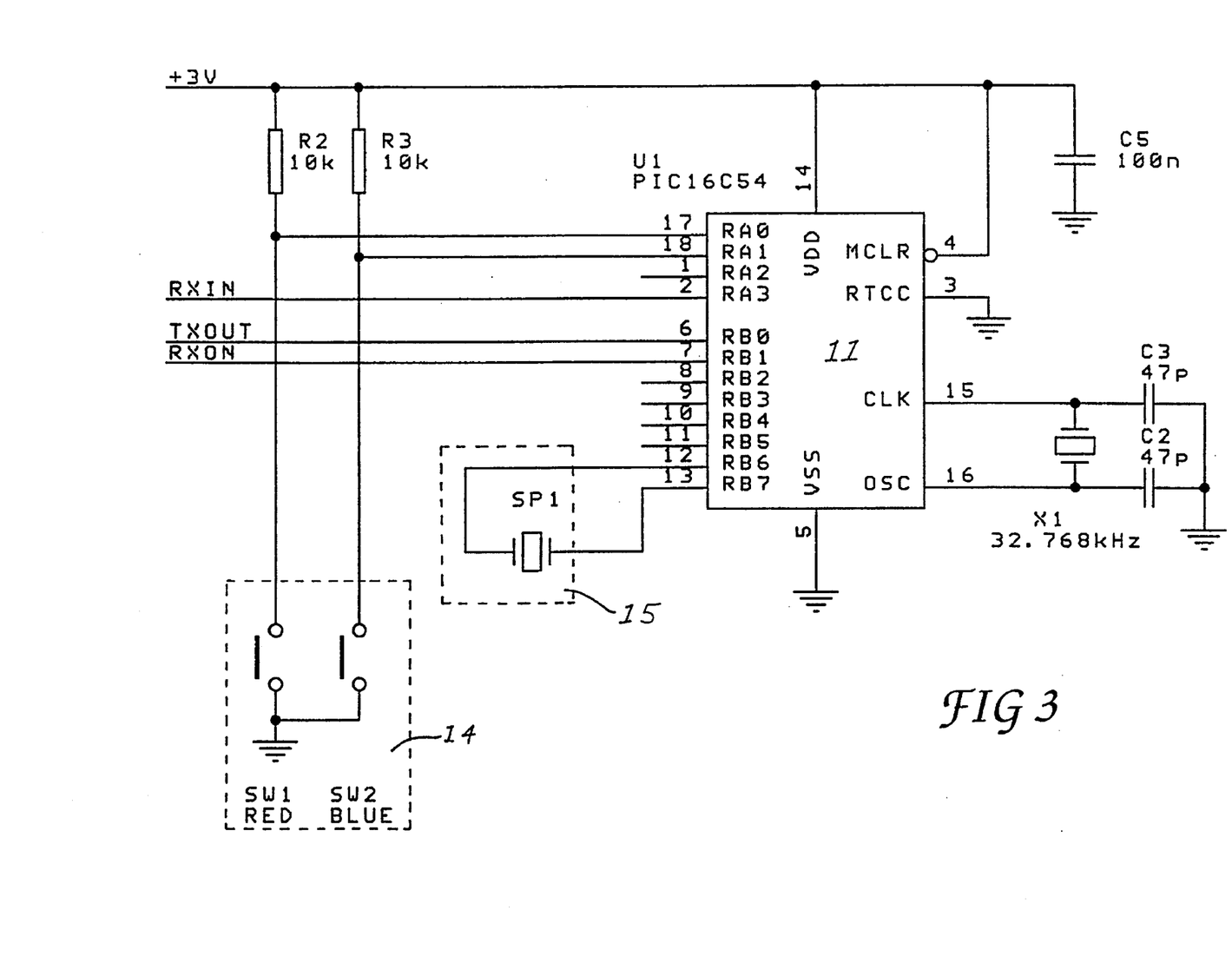
FIG. 3 is a block diagram of the circuitry associated with one embodiment of the controller shown in FIG. 2.

The preferred embodiment of the controller 11 and associated circuitry is shown in FIG. 3. The inventor has found that a suitable component for the controller is a PIC16C54 EPROM based 8 bit CMOS microcontroller available from Microchip Technology Inc. The chip requires an operating voltage of between 2.5 volts and 6.25 volts and is powered by 3 volts in the preferred embodiment. I/O lines RA0 to RA3 are configured as input lines. One of the inputs is configured to receive signals from the receiver 13 and two of the inputs are configured to receive signals from switches SW1 and SW2.

The switches may enable a number of operations such as remote vehicle entry, silence the audible alarm or locate the other one of a pair of parts.

I/O lines RB0 to RB7 are configured as outputs. Two of the lines are configured to control the operation of the transmitter 12 and receiver 13. The remainder of the lines are available for performing a variety of functions 15. In the simplest situation the only function may be the generation of an audible alarm such as by driving a piezoelectric disc. If the controller is a component of the third part 3 the range of functions will be more extensive and will include such functions as door locking or unlocking.

The controller 11 performs a range of functions to control the operation of the part including:

control all timing generate code sequences decode code sequences monitor switch operations drive audible alerts monitor power supply voltage implement low power mode.

Figure 4:
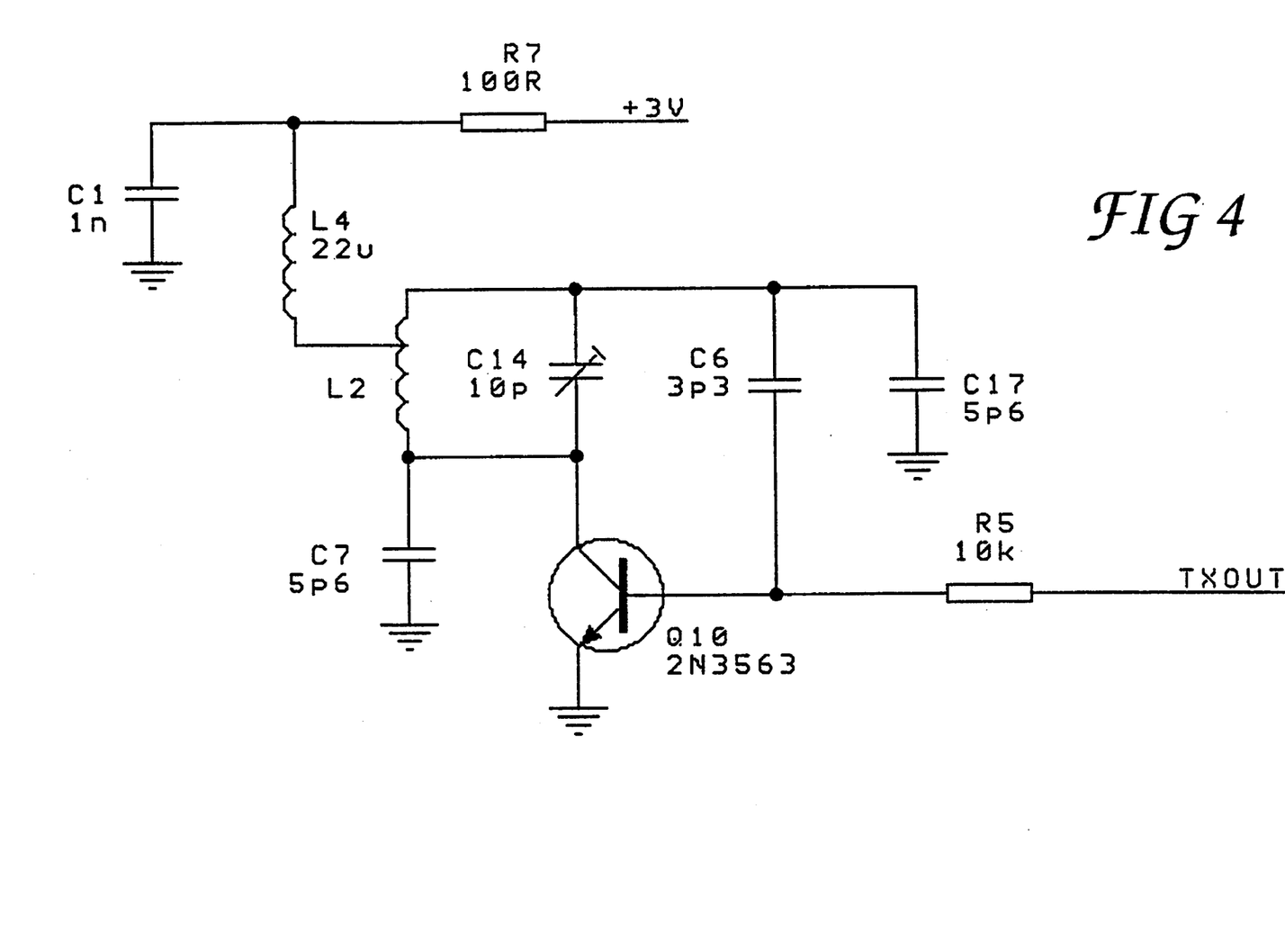
FIG. 4 is a block diagram of the circuitry associated with one embodiment of the transmitter shown in FIG. 2.

FIG. 4 shows a schematic electric circuit for the preferred embodiment of the transmitter 12. The transmitter is a low power device operating at 304 MHz. The transmitted signal is amplitude modulated by the code sequence generated by the controller 11. To reduce power consumption and minimise interference from other security access arrangements the transmitter is operated with a low duty cycle. The signal is transmitted from L2 which is formed as a PCB track.

Figure 5:
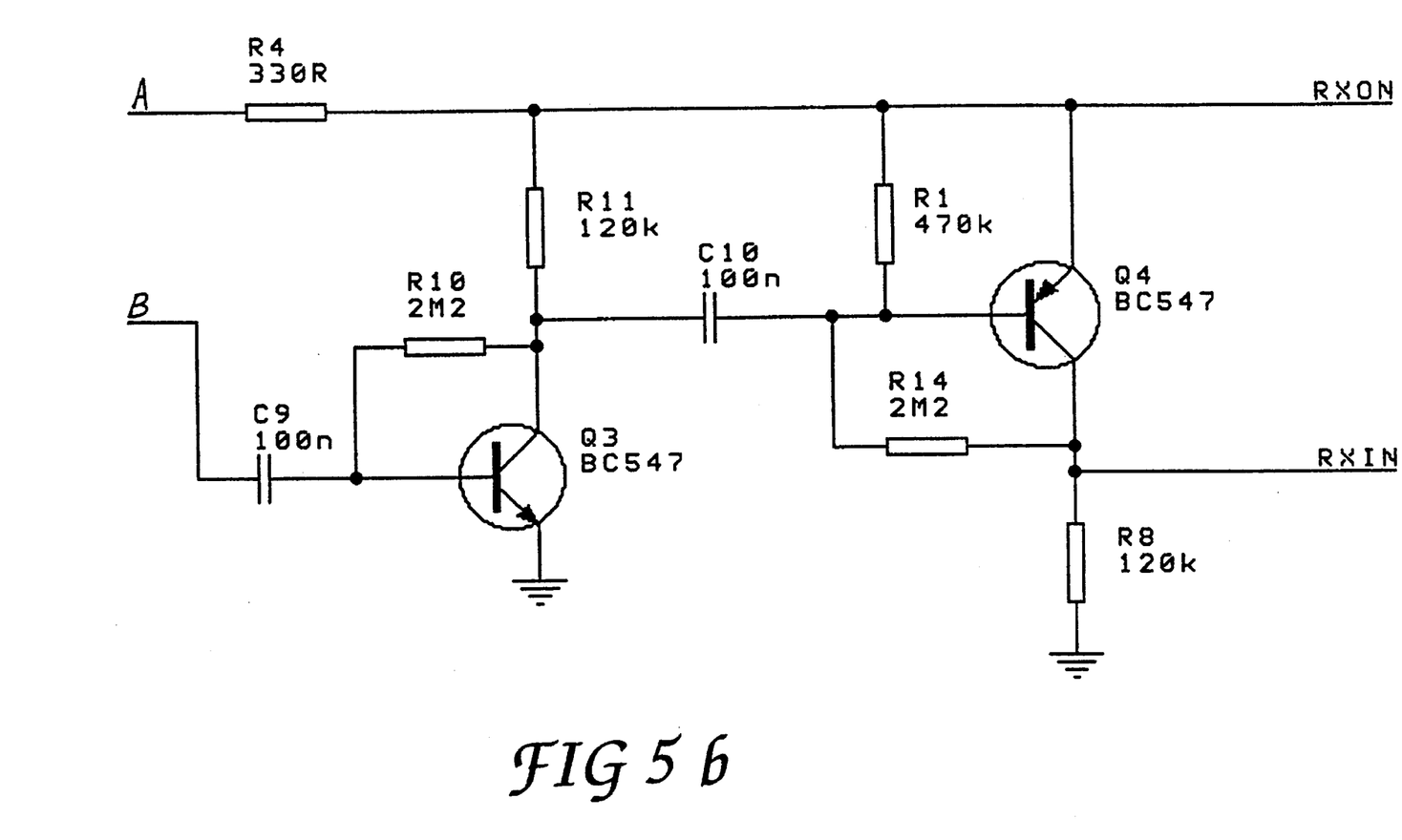
FIG. 5 is a block diagram of the circuitry associated with one embodiment of the receiver shown in FIG. 2.
Figure 5A:
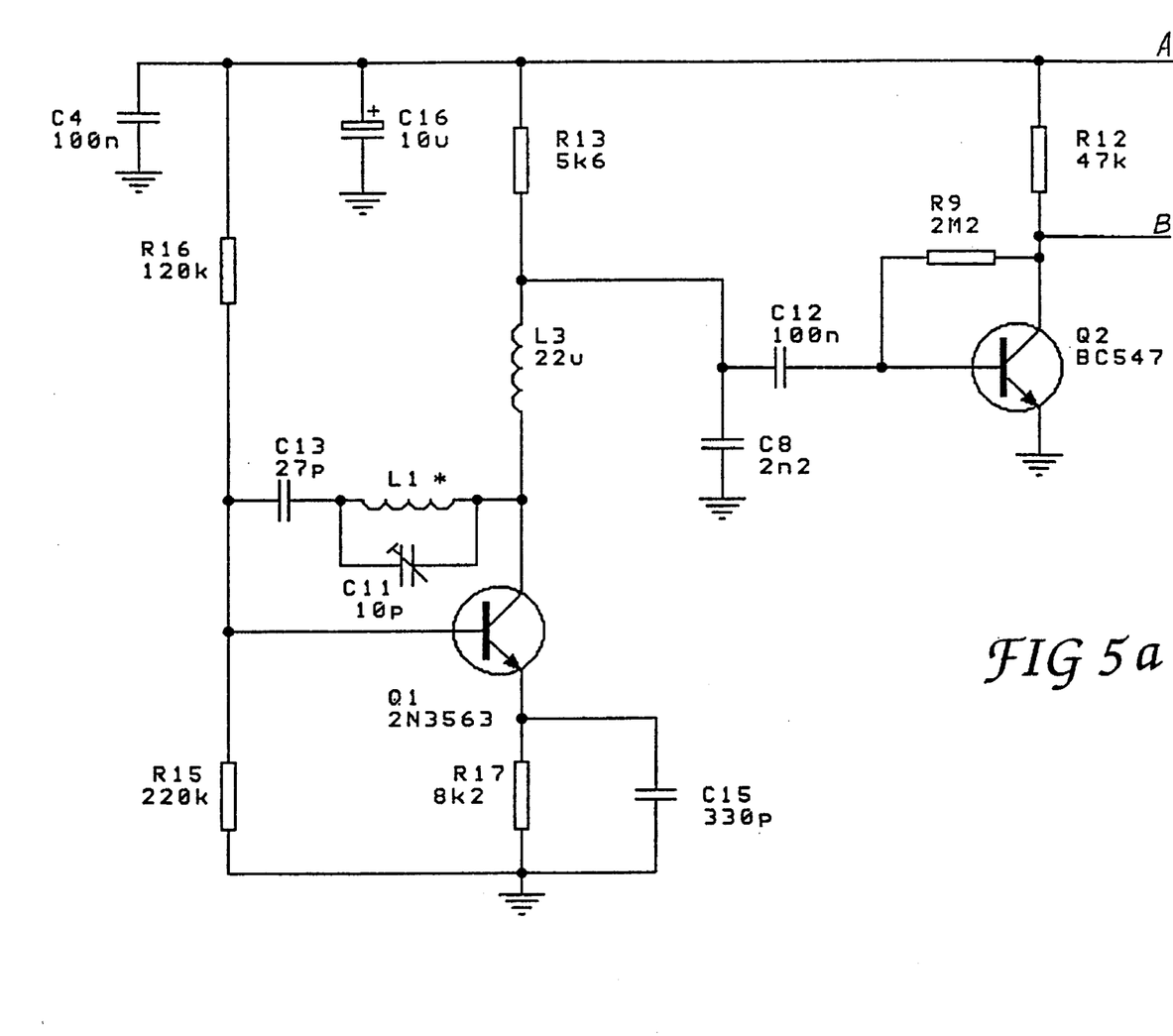

A schematic electric circuit for the receiver 13 is shown in FIG. 5. The receiver is tuned to receive signals at the same frequency as emitted by a paired transmitter. The receiver demodulates the received amplitude modulated signal and feeds the received code to the controller 11.

Figure 6:
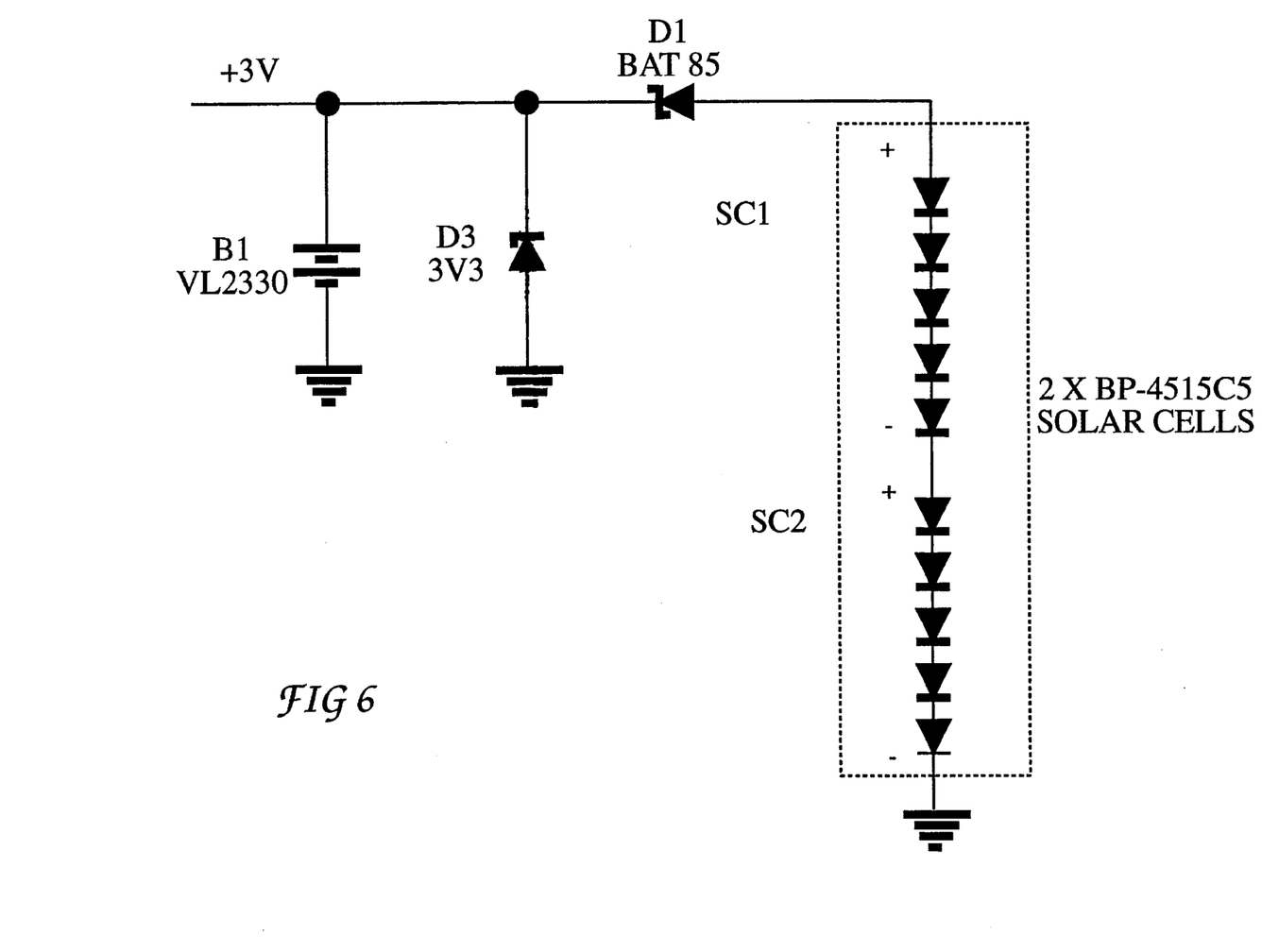
FIG. 6 is a block diagram of the circuitry associated with one embodiment of the battery and solar cells shown in FIG. 2.

The preferred embodiment of the power supply 16 is depicted schematically in FIG. 6. It comprises a battery B1 which is trickle charged by two solar cell arrays SC1 and SC2. The battery is a 3 volt lithium cell that provides all the power necessary for the component. The battery acts as an accumulator by providing peak power requirements for the component and recharging during period of low power requirement.

The two solar cell arrays generate the power for the component. Even under moderately low light conditions, such as under incandescent lights, the solar cells can generate sufficient power to operate the component.

Figure 7:
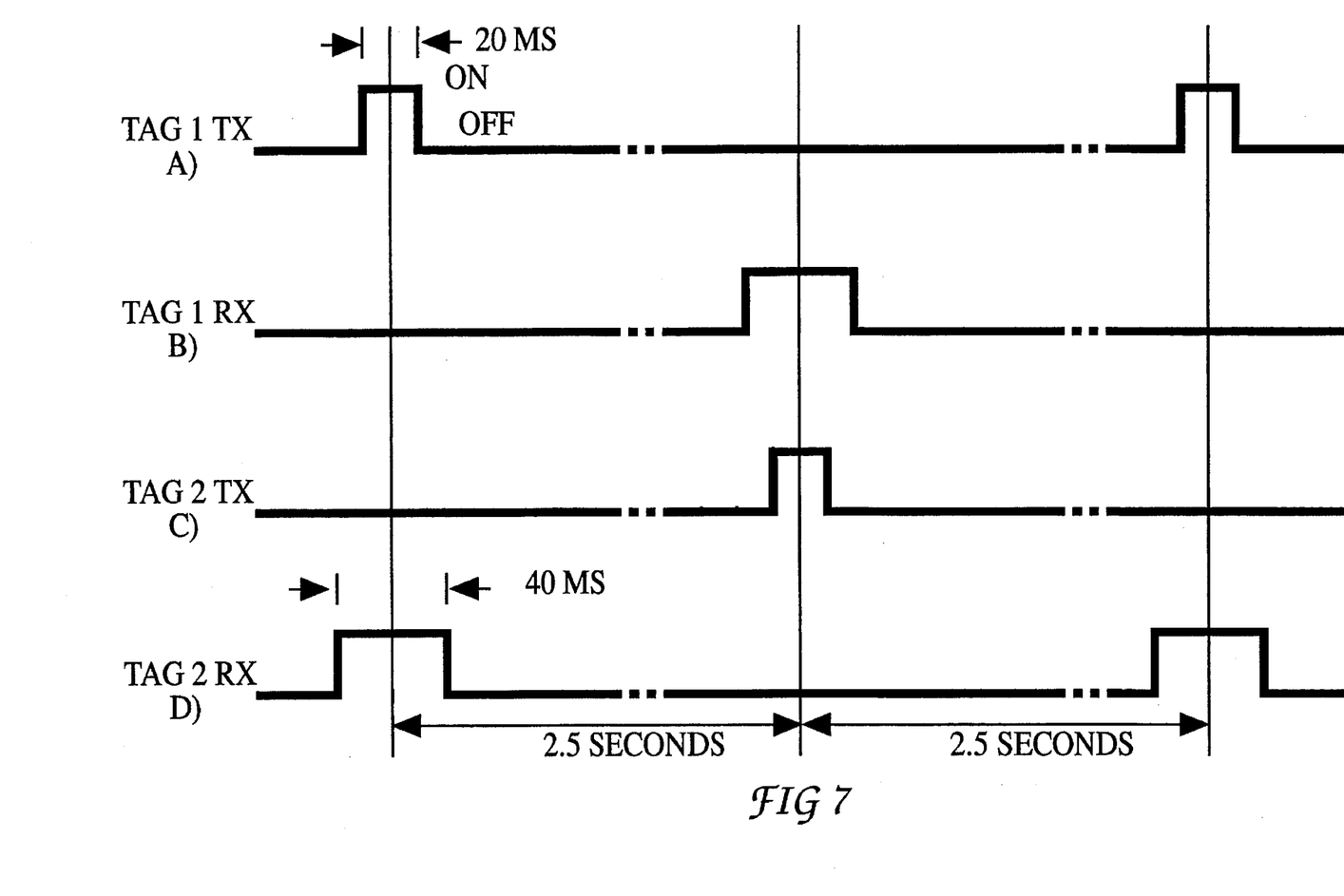
FIG. 7 is a timing diagram of the receiver and transmitter operations of a security access arrangement.

As mentioned above the transmitter is operated at a low duty cycle to conserve battery power. It is also desirable to only operate the receiver when a transmitted signal is expected. An initial period is required for the synchronisation of the transmitter and receiver of a pair of tags. This is achieved by having the receiver continuously on until a signal is received. Once a signal is received the controller locks to the transmission duty cycle and only turns the receiver on accordingly. The tags are preferably configured to operate on a peer-to-peer basis rather than a master-slave basis so the transmitter and receiver duty cycles of a pair of tags will be as depicted in FIG. 7.

Although each part of the security access arrangement can perform any role it will be appreciated that in any given application each part will be configured to perform a different role. To differentiate these roles and assist in further description the first part associated with an authorised person will be referred to as a signal enabling tag (SET), the second part associated with an item will be referred to as a signal transmitting tag (STT) and the third part associated with the restricted area will be referred to as a receiver/controller.

Figure 8:
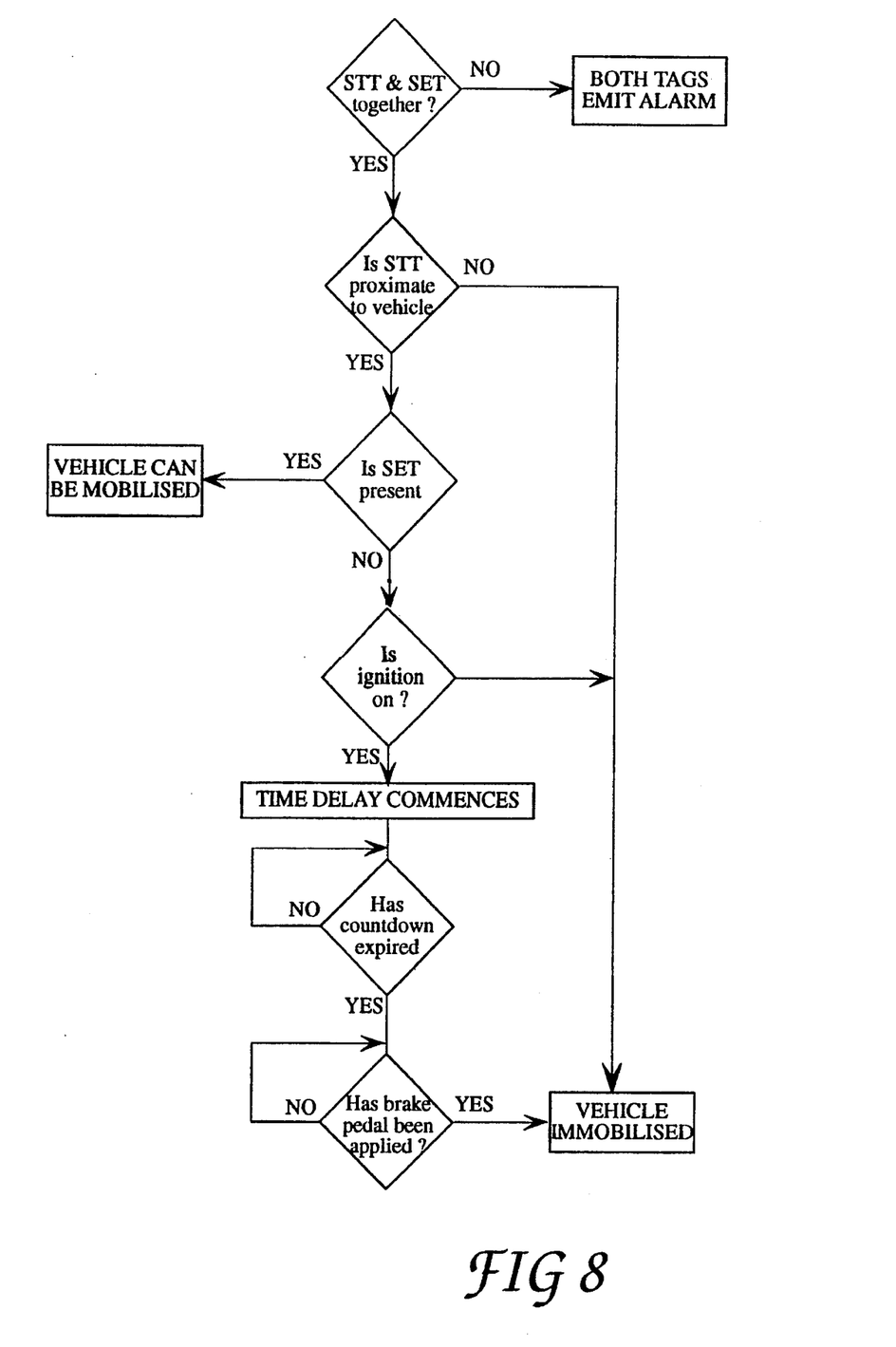
FIG. 8 is a flowchart of the operation of the invention when configured as a vehicle security access arrangement.

To more fully explain the advantages of the invention the operation in a specific application is described. FIG. 8 is a flowchart of the operation of a security access system applied to an automotive vehicle.

The flowchart shows that the SET and STT check that a signal is present to indicate that they are within a predetermined range. If the signals are not present either or both tags emit alarms. If the STT is within range of the vehicle and the SET is present the vehicle can be mobilised. If the SET and STT are subsequently separated different actions occur depending on the conditions. If the ignition is not on, the vehicle is immobilised and the doors are locked. If the ignition is on but the vehicle is stationary the ignition is turned off and the doors locked. If the ignition is on and the vehicle is moving the vehicle is not immobilised until the application of the brake pedal is applied and after a pre-set time delay period has expired. This is to ensure that the ignition is only turned off while the vehicle is slowing for reasons of safety.

If, for example, a vehicle user leaves the STT in the vehicle and ignores the alarm the doors will lock automatically and the vehicle will be immobilised. The user will still be able to access the vehicle because when the user returns, the SET will be in range of the STT and the doors can be automatically opened. A thief will not be able to steal the vehicle, even though the keys are in the vehicle, because without the SET the ignition will be inoperative.

Of course, any passenger in the vehicle will still be able to exit the vehicle using the normal door handle, notwithstanding the automatic door locking.

Other embodiments of the signal transmitting tag, signal enabling tag and receiver/controller will be evident to persons skilled in the art of electronics. A number of alternative arrangements are shown in the block circuit diagrams of FIGS. 9, 10 and 11.

Figure 9A:
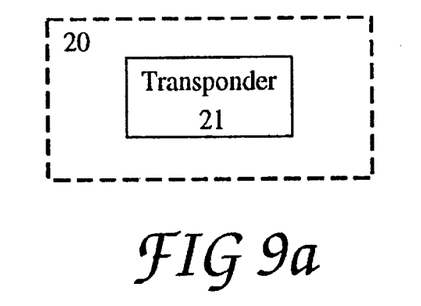
FIG. 9a is a block diagram of the circuitry of a first embodiment of a signal enabling tag.
Figure 9B:
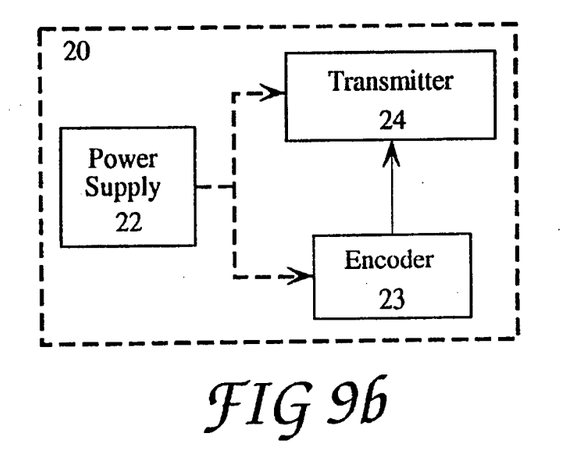
FIG. 9b is a block diagram of the circuitry of a second embodiment of a signal enabling tag.
Figure 9C:
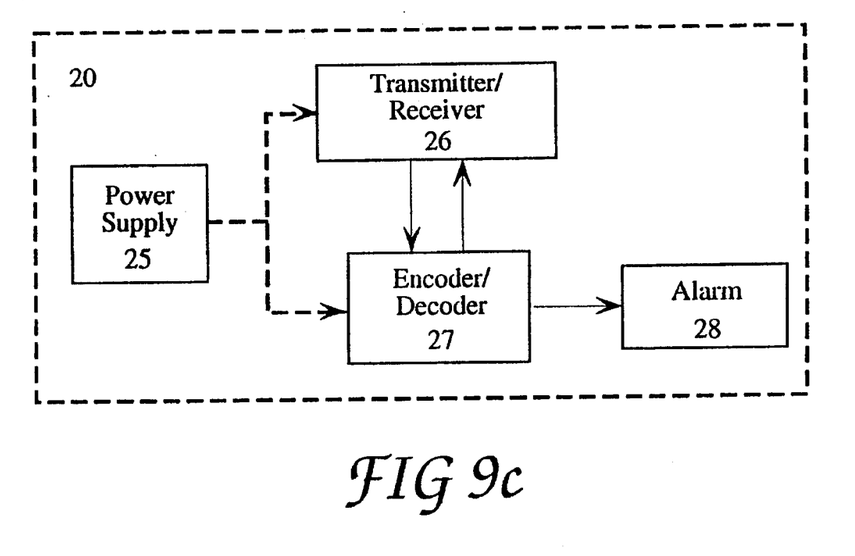
FIG. 9c is a block diagram of the circuitry of a third embodiment of a signal enabling tag.
Figure 10:
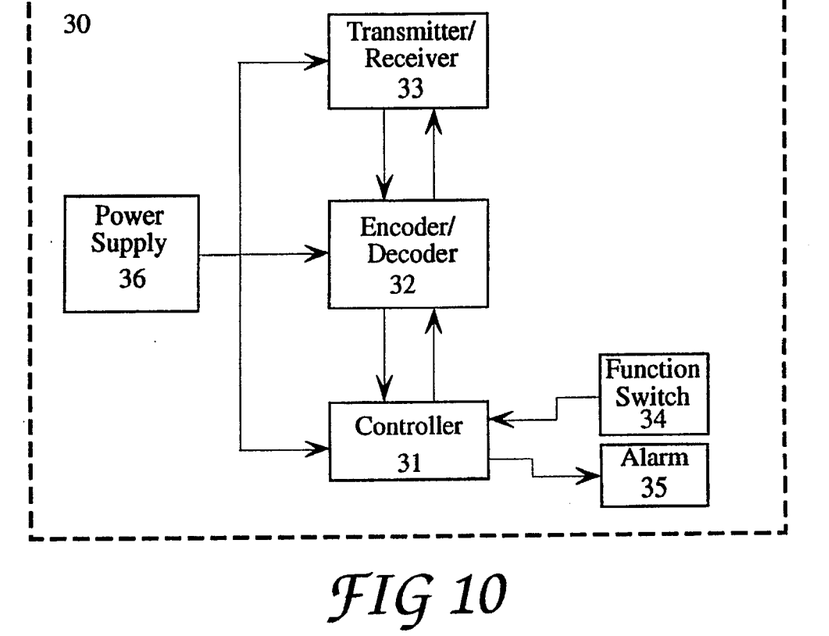
FIG. 10 is a block diagram of the circuitry of a signal transmitting tag.

FIG. 10 shows a block circuit diagram for a signal transmitting tag (STT) 30 of a security access arrangement. The STT comprises a power supply 36, a radio frequency transmitter/receiver 33, an encoder/decoder 32, a controller 31, an alarm 35, and function switches 34. The embodiment of FIG. 9 differs from the embodiment of FIG. 2 in that the encode/decode function is shown separately from the controller. It will be appreciated by those skilled in the art that this arrangement is functionally equivalent to the first preferred embodiment.

FIGS. 9a, 9b and 9c show three alternative embodiments of the signal enabling tag 20.

In one arrangement the radio frequency transmitter 33 periodically transmits short interrogating pulses of radio frequency energy that are received and retransmitted by a transponder 21 in a signal enabling tag (SET) 20 as shown in FIG. 8a. The transponder retransmits a signal that includes a code that is received by the STT receiver 33 and decoded by the STT decoder/encoder 32. Provided the correct coded signal is received the controller 31 enables the encoder 32 that passes a coded signal to the transmitter 33 for transmission to the receiver/controller 40 (FIG. 11) to facilitate access to the restricted facility.

If the STT receiver 33 does not receive a correctly encoded signal within a few milliseconds (less than 100 msec) of the transmission of the interrogating pulse the controller does not enable the encoder and access to the restricted facility is not permitted. Furthermore, the controller 31 activates the alarm 35 to indicate that the SET is out of range thereby warning the user to collect either the STT or SET from where it has been left.

To reduce power supply use in the STT the restricted facility access signal may only be transmitted on command. The command may be given by activating function switch 34. Alternatively, a motion detector switch may be employed or an enabling signal from the receiver/controller 40 may be employed.

In another arrangement (FIG. 9b) the SET 20 comprises a power supply 22, an encoder 23 and a radio frequency transmitter 24. In this embodiment the transmitter 24 constantly or periodically transmits a coded signal that is detected by the receiver 33 of the STT. As with the previous embodiment the STT is only able to access the restricted facility if the signal from the SET is received. If the SET signal is not received an alarm 35 is activated as in the previous embodiment.

A further arrangement incorporates an alarm in both the STT and the SET. The block circuit for the SET for this embodiment is shown in FIG. 9c. As with the first arrangement the STT transmits an interrogating signal that is received by the receiver/transmitter 26 and decoded by the encoder/decoder 27. Providing the correct code is detected the receiver/transmitter 26 transmits an encoded signal in response that is received by the receiver 33 of the STT. If no interrogating signal is received by the SET within a given time the alarm 28 is sounded. Similarly, the alarm 35 will sound at the STT because a signal will not be received from the SET.

The alarms may indicate either that the power supply of one or both of the SET or STT is below a threshold level or that the SET and STT are not within range of one another. Which of these situations apply will be evident from the location of the SET and STT and remedial action can be taken. Both the SET and STT may have alarm disable switches so that the alarm can be turned off while the fault condition is corrected.

While a limited number of specific embodiments have been described it will be evident to those skilled in the art that the various block circuits can be employed in almost any combination. The best configuration in any given situation will depend on the particular conditions and requirements.

Figure 11:
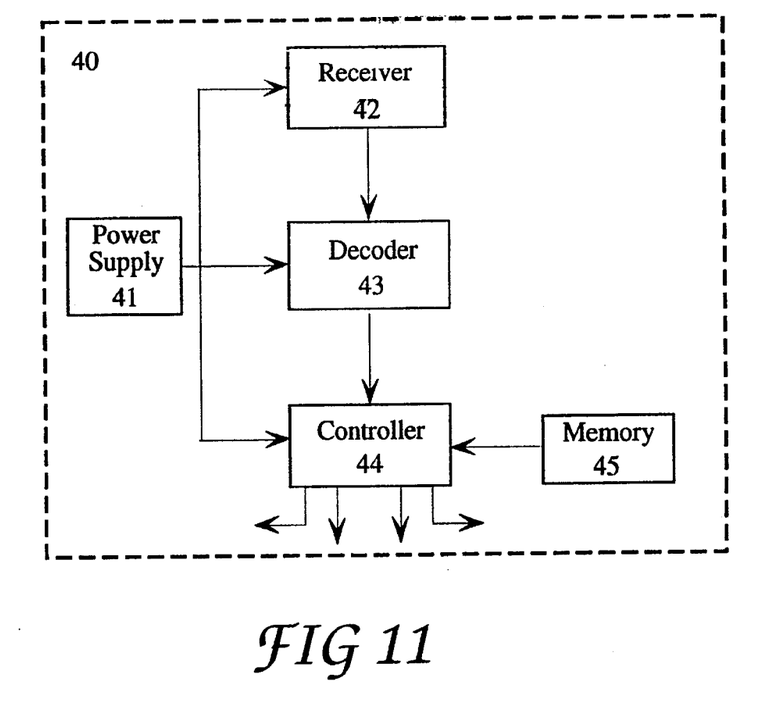
FIG. 11 is a block diagram of the circuitry of a receiver/controller.

Looking now at FIG. 11 there is shown an alternate arrangement for a receiver/controller. The receiver/controller 40 comprises a power supply 41, radio frequency receiver 42, decoder 43, controller 44 and code memory 45. The receiver 42 receives a coded signal from the transmitter 33 of the STT. The decoder 43 decodes the signal and passes the code to the controller 44 where it is checked against a code memory 45. If the code is an authorised code the controller performs the indicated function, such as unlock doors, activate ignition etc.

It will be appreciated that the decoder 43, controller 44 and code memory 45 can be embodied in a single device such as the PIC16C54 device described in the first preferred embodiment.

The controller 44 may also perform automatic functions such as relocking doors if the STT moves out of range. In the case where the security access system is used in an automotive vehicle application the controller 44 will act to disable the vehicle in certain circumstances.

The code memory 45 stores the codes for all authorised users and all functions. The function switch 34 of the STT can be configured to select from a variety of functions and the appropriate code transmitted as required. For example, a single depression of the function switch may transmit a code to unlock vehicle doors, two quick depressions may transmit a code to unlock doors and turn on the radio. Furthermore, the code memory 45 can store individual codes for a large number of users. Thus if one authorised user loses a tag the code for that tag can be erased without affecting the integrity to all other tags.

In the preferred embodiments the controller 11, 31 or 44 is a microprocessor programmed for the desired functions. The advantage of using a microprocessor is that it can be programmed for any of a range of desired functions and can be easily reprogrammed as required.

In a further preferred embodiment the invention can be employed as an item security system wherein the SET is embodied in an item normally located on an authorised person and the STT is attached to an item that it is desired to secure. For this application of the invention both tags could have the block circuit depicted in FIG. 2. Both tags would transmit a low power coded signal to be received by the receiver of the other tag. If either tag ceases to receive the signal it would sound an alarm. If only one alarm sounds this would indicate a power supply problem. If the tags become separated by greater than a predetermined amount both tags would sound an alarm.

Throughout the description of preferred embodiments reference has been made to low power transmitters and receivers which communicate over a limited range. A break in communication due to exceeding the limited range results in an alarm. The invention could also be configured to activate a higher power transmission if the communication link is broken, the higher power transmission would include a signal to activate the alarm. In some situations a positive activation of the alarm may be preferable to a negative activation (ie. loss of signal).

Other variations in the details of the embodiments of the invention will be evident to those skilled in the art without departing from the spirit of the invention.

I claim:

1. A security access arrangement comprising:

a first part associated with an authorised person;

a second part adapted to be attached to an item; and a third part associated with a restricted access area; wherein the first, second and third parts include equivalent electronic circuitry comprising:

a signal transmitting means adapted to transmit coded signals;

controller means in electrical connection with the signal transmitting means and adapted to supply coded signals to the signal transmitting means;

signal receiving means in electrical connection with the controller means and adapted to receive coded signals and supply the received coded signals to the controller means; and a power supply adapted to power the operation of the signal transmitting means, signal receiving means and controller means;

said first, second and third parts being separate from one another and being arranged such that access to the restricted area can only be obtained if the first, second and third parts are proximate one another.

2. The security access arrangement of claim 1 wherein said first and second parts are arranged such that an alarm is activated by the controller means if the controller means ceases to receive the coded signals from the signal receiving means due to the separation of the parts being greater than a pre-determined distance.

3. The security access arrangement as in claim 1 further including means for indicating when the separation between the first part and the second part exceed a pre-set range.

4. A security access arrangement including:

a signal enabling tag adapted to be carried by an authorised person and adapted to transmit an enabling signal;

a signal transmitting tag adapted to transmit a coded transmit signal and comprising signal enabling tag detection means adapted to detect the presence of the signal enabling tag;

a signal receiver/controller means associated with an area of restricted access and adapted to receive signals from the signal transmitting tag when the signal transmitting tag is within a pre-set range and interpret the received signals and to activate one or more predetermined functions;

said signal enabling tag, said signal transmitting tag and said signal receiver/controller means all being separate from one another; and, wherein the signal transmitting tag does not transmit the coded signal unless the signal enabling tag and the signal transmitting tag are proximate to one another.

5. The security access arrangement of claim 4 wherein the signal enabling tag, signal transmitting tag, and receiver/ controller means each have the same electronic circuitry comprising:

a signal transmitting means adapted to transmit a coded signal which is the enabling signal and coded transmit signal of the signal enabling tag and signal transmitting tag respectively;

a controller means in electrical connection with the signal transmitting means and adapted to supply coded signals to the signal transmitting means;

signal receiving means in electrical connection with the controller means and adapted to receive coded signals and supply the received coded signals to the controller means; and, a power supply adapted to power the operation of the signal transmitting means, signal receiving means, and controller means.

6. The security access arrangement of claim 5 wherein the controller means is a programmable microprocessor having a plurality of input lines and output lines and includes associated memory means.

7. The security access arrangement of claim 5 wherein the controller means is a programmable microprocessor having a plurality of input lines and output lines and includes associated memory means and further comprising one or more switches in electrical connection with the input lines of the controller means, said switches being adapted to provide signals to the controller means to enable one or more of a range of functions able to be provided by the controller means.

8. The security access arrangement of claim 5 wherein either or both of the signal enabling tag or the signal transmitting tag further comprises an alarm which is activated by the controller means of the respective tag if the separation between the signal enabling tag and the signal transmitting tag exceeds a pre-determined distance so that the controller means of the respective tag ceases to receive signals from the receiving means of the respective tag.

9. The security access arrangement of claim 5 wherein the controller means is adapted to perform one or more functions selected from the group including: control all timing; generate code sequences; decode code sequences; monitor switch operations; drive audible alerts; monitor power supply voltage; and implement low power mode.

10. The security access arrangement of claim 5 wherein the signal transmitting means transmits a low power, low duty cycle electromagnetic signal which is amplitude modulated by a code sequence generated by the controller means.

11. The security access arrangement of claim 5 wherein the signal receiving means is adapted to receive and demodulate signals received from the signal transmitting means.

12. The security access arrangement of claim 5 wherein the power supply comprises a battery and solar power conversion means arranged such that the solar power conversion means continuously charges the battery when the solar power conversion means is exposed to ambient light.

13. The security access arrangement of claim 4 wherein the signal enabling tag comprises a battery-free, radio frequency transponder that returns a coded signal in response to an interrogating pulse from the signal transmitting means of the signal transmitting tag.

14. The security access arrangement of claim 4 wherein the signal enabling tag comprises a power supply and a radio frequency transmitter that constantly transmits an identification coded signal.

15. The security access arrangement of claim 4 wherein the signal enabling tag comprises a power supply, a radio frequency receiver/transmitter and an encoder/decoder module.

16. The security access arrangement as in claim 4 further including means for indicating when the separation between the signal enabling tag and the signal transmitting tag exceed a pre-set range.

* * * * *